United States Patent
Hokao et al.

Patent Number: 6,044,279
Date of Patent: *Mar. 28, 2000

[54] PORTABLE ELECTRONIC APPARATUS WITH ADJUSTABLE-VOLUME OF RINGING TONE

[75] Inventors: Tomoaki Hokao; Michihiro Ohsuge, both of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/868,676

[22] Filed: Jun. 4, 1997

[30] Foreign Application Priority Data

Jun. 5, 1996 [JP] Japan ................................. 8-142054

[51] Int. Cl.[7] ................................................. H04Q 7/32
[52] U.S. Cl. ........................................ 455/567; 455/550
[58] Field of Search .................................... 455/458, 550, 455/567, 575; 379/373, 375; 381/56–58, 104, 107

[56] References Cited

U.S. PATENT DOCUMENTS

| | | | |
|---|---|---|---|
| 5,131,030 | 7/1992 | Cameron | 379/373 |
| 5,703,931 | 12/1997 | Martensson | 455/567 X |
| 5,771,297 | 6/1998 | Richardson | 381/57 |
| 5,809,411 | 9/1998 | Kudoh et al. | 455/348 |
| 5,842,139 | 11/1998 | Muramatsu et al. | 455/567 X |

FOREIGN PATENT DOCUMENTS

| | | |
|---|---|---|
| 507482 | 10/1992 | European Pat. Off. . |
| 781071 | 6/1997 | European Pat. Off. . |
| 63-185332 | 11/1988 | Japan . |
| 6-326758 | 11/1994 | Japan . |
| 2308785 | 7/1997 | United Kingdom . |
| 9716932 | 5/1997 | WIPO . |

*Primary Examiner*—Dwayne D. Bost
*Assistant Examiner*—William G. Trost
*Attorney, Agent, or Firm*—Sughrue, Mion, Zinn, Macpeak & Seas, PLLC

[57] ABSTRACT

A portable electronic apparatus having an adjustable ringing tone volume, a light receiving element 4 for detecting external light and a control circuit 3 for controlling he tone volume in response to light detection by the light receiving element 4. When the light receiving element 4 detects light as the power supply is turned on, or a specified key arranged on the external face of the housing is pressed down, the control circuit 3 causes a loudspeaker 7 to sound a test tone, picks up its echo with a microphone 5, and stores the volume of the echo into a memory 6 as a reference volume level. The control circuit 3, when notified of the arrival of a call by a transmitter/receiver circuit 2, causes the loudspeaker 7 to sound a test tone unless the light receiving element 4 detects light, picks up its echo with the microphone 5, and compares the volume of the echo with the reference volume level stored in the memory 6. The control circuit 3, if it finds the volume of the echo greater than the reference volume, will increase the volume of the ringing tone from the loudspeaker 7. The control circuit 3, when detecting a change in ambient light (by the light receiving element 4), switches the means of notice of call arrival from the sounding of the ringing tone by the loudspeaker 7 to intermittent lighting by an LED 8.

5 Claims, 4 Drawing Sheets

PORTABLE ELECTRONIC APPARATUS WITH ADJUSTABLE-VOLUME OF RINGING TONE

BACKGROUND OF THE INVENTION

The present invention relates to a portable electronic apparatus, and more particularly to a portable telephone whose ringing tone can be adjustable in volume.

According to the prior art, a portable telephone, which is a sort of portable electronic apparatus, is annoying at night if its ringing tone is set too loud, sometimes even so loud as to awaken sleeping persons. To prevent this nuisance, the ringing tone volume is adjusted based on the ambient lightness, as described in the Gazette of the Utility Model Laid-open No. 1988-185332.

More specifically, such a portable telephone is provided with a ringing tone generator, selector switches, a controller, a light meter, a volume control knob and a bell. When the controller is selected by the selector switches, the controller adjusts the volume of the ringing tone according to the light level detected by the light meter.

In this case, the turning of the selector switches to the controller side by the user of the telephone causes the controller to reduce the ringing tone volume when the ambience is dark, such as during the user's sleeping hours, and thereby to prevent the tone from being too loud at night and from awakening the user of the telephone or anyone else nearby.

However, the conventional telephone described above, because its ringing tone volume is reduced when its light meter detects the ambient darkness, has the disadvantage that the ringing tone is hardly audible if the portable telephone, with its selector switches kept turned to the controller side, is put into the user's bag or the like.

Furthermore, even if the telephone is put into a bag with its selector switches turned to the volume control knob side, if the ringing tone volume is set with the volume control knob loud enough to be audible from within the bag, the tone would be so loud, when the portable telephone is taken out of the bag, as to annoy the people nearby.

SUMMARY OF THE INVENTION

An object of the present invention is to obviate the aforementioned problems and provide a portable electronic apparatus whose ringing tone, even when the apparatus is kept in a bag or the like, can be sufficiently audible from outside the back or the like.

Another object of the invention is to provide a portable electronic apparatus whose ringing tone, when the apparatus is taken out of the bag or the like while it is ringing, would not be so loud as to annoy the people nearby.

A portable electronic apparatus according to the invention is provided with an output circuit for sounding a test tone of a preset volume when a call arrives; a comparator for comparing the volume of the echo of the test tone around the apparatus with a preset reference volume level; and a control circuit for increasing the ringing tone volume when the comparator finds the volume of the echo greater than the reference level.

Another portable electronic apparatus of the invention is provided, in addition to the above-described configuration, with a detector circuit for detecting light around the apparatus, wherein the control circuit controls the ringing tone volume when no light has been detected by the detector circuit.

Still another portable electronic apparatus of the invention is provided, in addition to the above-described configuration, with a circuit for holding as reference volume level the volume of the tone resulting from the echoing around the apparatus of the test tone supplied from the output circuit in response to an external instruction when the detector circuit has detected the light.

A portable electronic apparatus of the invention has one or more photodiodes, arranged on the outside of the housing, as light receiving elements for detecting ambient light. If the photodiodes detect light when the power supply of the portable electronic apparatus is turned on or a specified key arranged on the outside of the housing is pressed down, a test tone is supplied from a loudspeaker, and its echo is picked up by a microphone to memorize its volume as reference volume level.

Unless the photodiodes detect any light when a call arrives at the portable electronic apparatus, the loudspeaker sounds a test tone, whose echo is picked up by the microphone to compare its volume with the reference level. If the volume of the echo is found greater than the reference volume, the ringing tone is made louder, so that it be sufficiently audible even when the portable electronic apparatus is kept in a bag or the like.

The photodiodes are seeking to detect light even when the portable electronic apparatus is kept in a bag or the like. If they detect tight when the portable electronic apparatus is taken out of the bag or the like, the sounding of the ringing tone is turned off, followed by intermittent lighting of a light emitting element (a light emitting diode or the like).

This configuration makes it possible not to annoy the persons nearby with the ringing tone because, even if its volume is large, it is turned off when the portable electronic apparatus is taken out of the bag or the like. Incidentally, by arranging the light receiving faces of the photodiodes on the external face of the housing, they are enabled to detect light around the portable electronic apparatus when it is held by hand or placed on a desk.

BRIEF DESCRIPTION OF THE DRAWINGS

The above-mentioned and other objects, features and advantages of the present invention will become more apparent from the following detailed description when taken in conjunction with the accompanying drawings, wherein.

In the drawings, identical reference numerals denote identical structural elements.

DETAILED DESCRIPTION OF THE PREFERRED EMBODIMENT

Figure 1:
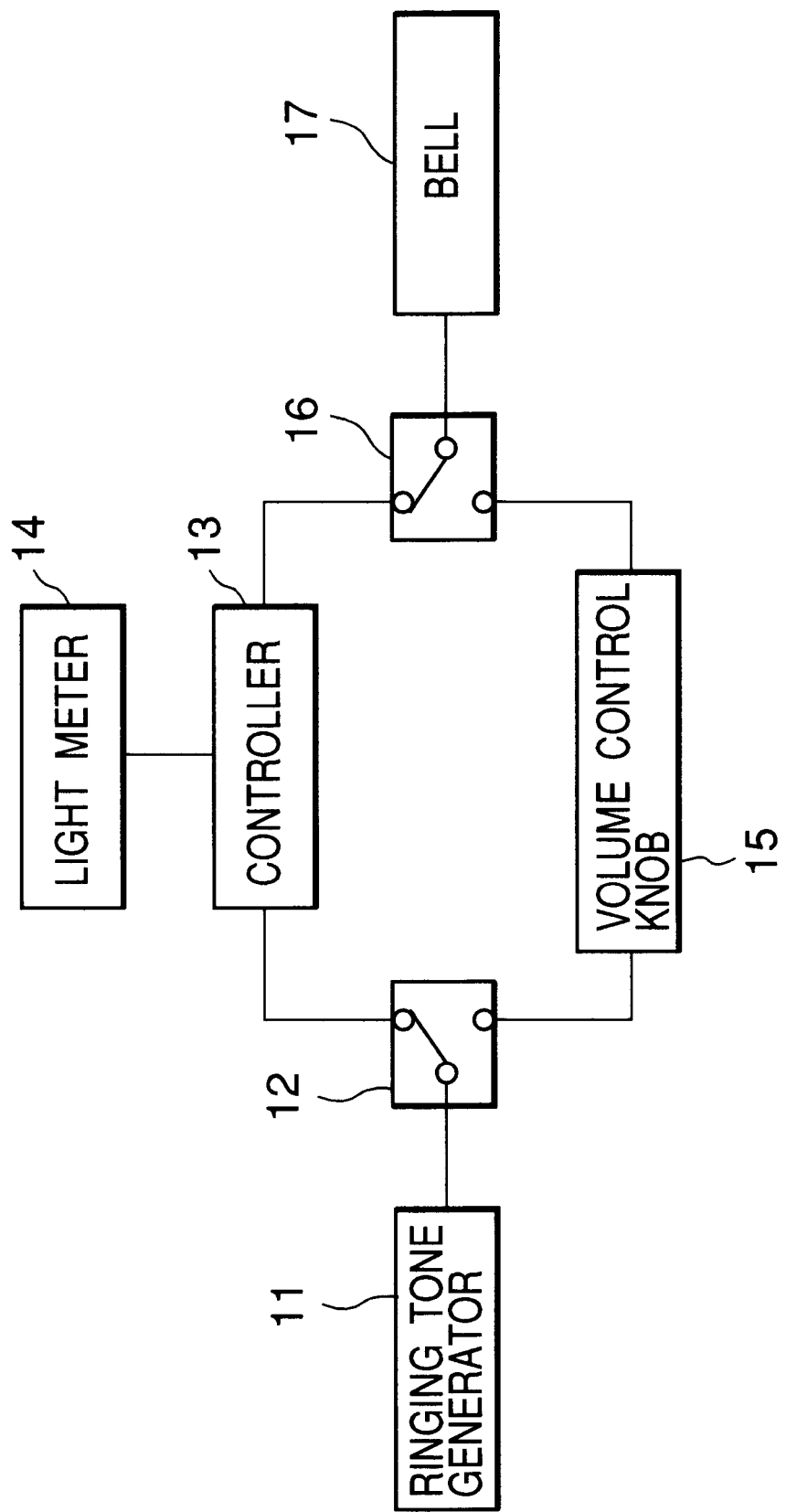
FIG. 1 is a block diagram of a portable telephone whose ringing tone volume is adjustable according to the prior art.

To facilitate the understanding of the present invention, the relevant prior art will be described first with reference to FIG. 1. Referring to FIG. 1, a portable telephone whose ringing tone volume is adjustable according to the prior art is provided with a ringing tone generator 11, selector switches 12 and 16, a controller 13, a light meter 14, a volume control knob 15 and a bell 17. When the controller 13 is seledted by the selector switches 12 and 16, the controller 13 adjusts the volume of the ringing tone from the ringing tone generator 11 according to the light level detected by the light meter 14.

The turning of the selector switches 12 and 16 to the controller side by the user of this portable telephone can cause the controller 13 to reduce the ringing tone volume when the ambience is dark, such as during the user's sleeping hours, and thereby to prevent the tone from being too loud at night and from awakening the user of the telephone or anyone else nearby. However, as described above, with this prior art portable telephone, because its ringing tone volume is reduced when its light meter detects the ambient darkness, the ringing tone is hardly audible if the portable telephone, with its selector switches kept turned to the controller side, is put into the user's bag or the like.

Figure 2:
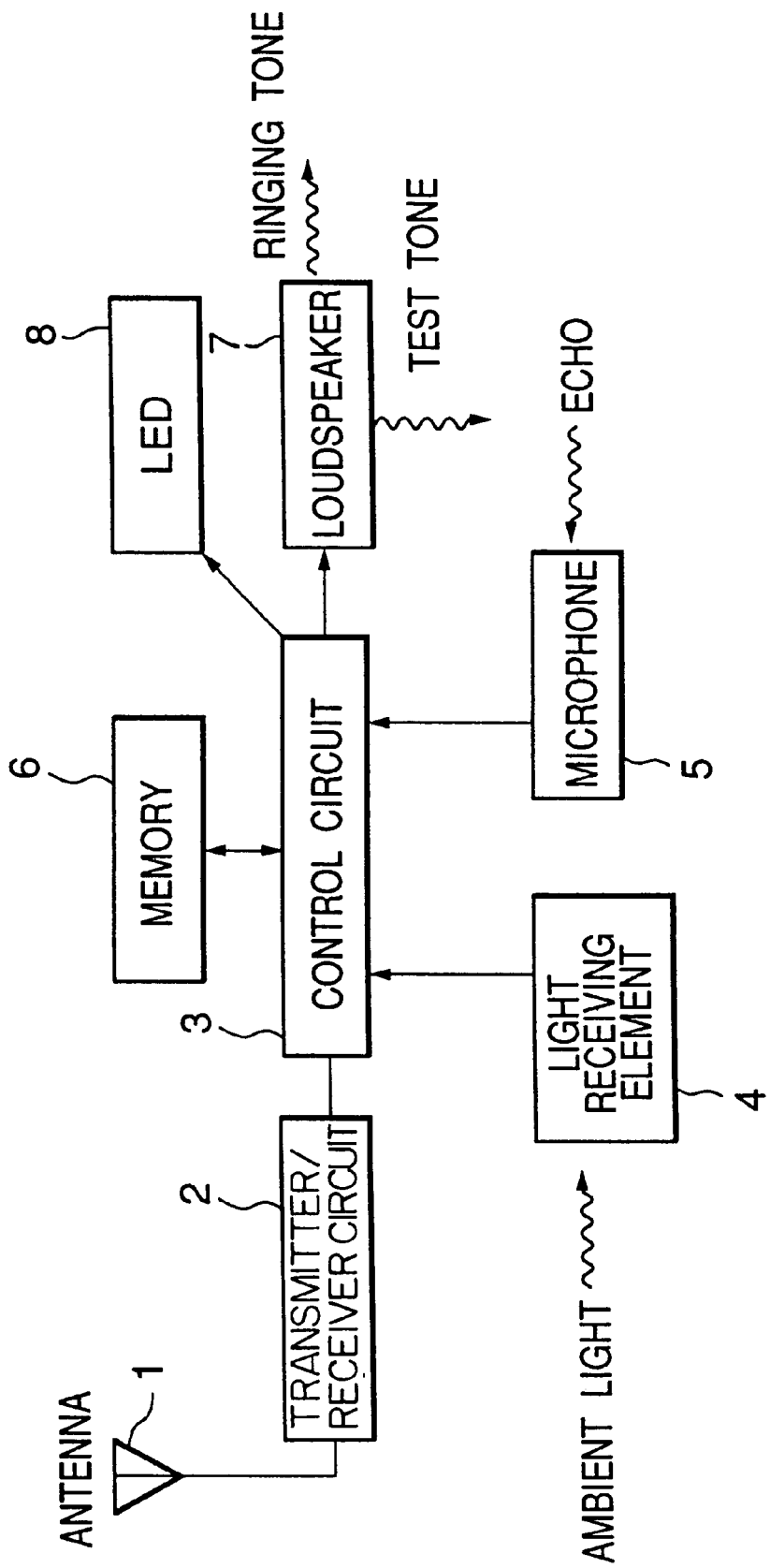
FIG. 2 is a block diagram of a preferred embodiment of the invention.

FIG. 2 is a block diagram of a preferred embodiment of the present invention. Referring to FIG. 2, a transmitter/receiver circuit 2, upon detection of the arrival of a call according to a signal received via an antenna 1, notifies a control circuit 3 of the call arrival. A light receiving element 4 consists of one or more photodiodes, whose light receiving faces are arranged on the external face of a housing (not shown). The light receiving faces of the photodiodes are arranged in one or more positions on the external face of the housing, so that it can detect light around the portable electronic apparatus even when the apparatus is held by hand or placed on a desk.

A microphone 5 picks up the user's speech during normal telephone conversation. The speech picked up by the microphone 5 is sent to the other party to the conversation via the control circuit 3, the transmitter/receiver circuit 2 and the antenna 1. A loudspeaker 7 sounds the speech sent from the other party via the antenna 1, the transmitter/receiver circuit 2 and the control circuit 3.

The control circuit 3, primarily comprising a microprocessor, controls the other constituent elements mentioned above. More specifically, the control circuit 3, if the light receiving element 4 detects light when the power supply is turned on or a specified key (not shown) arranged on the external face of the housing is pressed down, causes the loudspeaker 7 to sound a test tone, picks up its echo with the microphone 5, and stores the volume of the echo into a memory 6 as reference volume level.

The control circuit 3, when notified of the arrival of a call by the transmitter/receiver circuit 2, causes the loudspeaker 7 to sound a test tone unless the light receiving element 4 detects light, picks up its echo with the microphone 5, and compares the volume of the echo with the reference volume level stored in the memory 6. If, as a result, the volume of the echo is found greater than the reference volume, the control circuit 3 will increase the volume of the ringing tone to be emitted from the loudspeaker 7.

Meanwhile, the light receiving element 4 is seeking to detect light even when the portable telephone is kept in a bag or the like. If the light receiving element 4 detects light when the portable telephone is taken out of the bag or the like, the control circuit 3 turns off the ringing tone emitted from the loudspeaker 7, and changes the means of notice of call arrival from the sounding of the ringing tone by the loudspeaker 7 to intermittent lighting by a light emitting diode (LED) 8.

Figure 3:
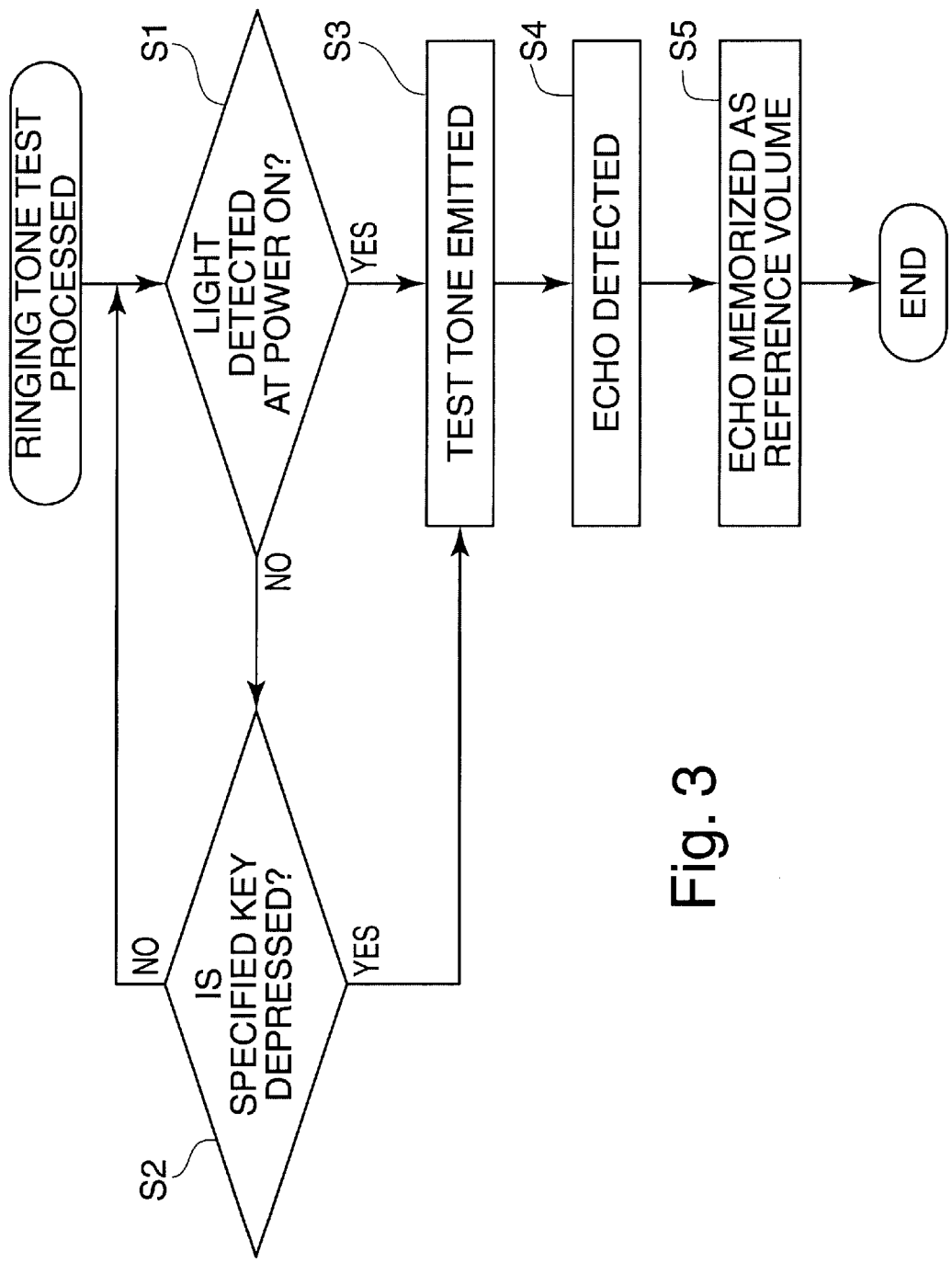
FIGS. 3 and 4 are flow charts for describing the operation of the invention.

FIG. 3 is a flow chart illustrating the processing of ringing tone testing (processing of reference level setting) according to the present invention. The processing of ringing tone testing is carried out in a light ambience, and the volume level in that ambience is memorized in an EPROM or the like.

Referring to FIG. 3, if the light receiving element 4 detects light when the power supply is turned on (step S1 in FIG. 3) or a specified key arranged on the external face of the housing is pressed down (step S2 in FIG. 3), the test tone is emitted from the loudspeaker 7 (step S3 in FIG. 3).

The control circuit 3, when the echo of the test tone emitted from the loudspeaker 7 is picked up by the microphone 5 (step S4 in FIG. 3), stores the volume of the echo picked up by the microphone 5 as reference volume level into the memory 6 (step S5 in FIG. 3).

Figure 4:
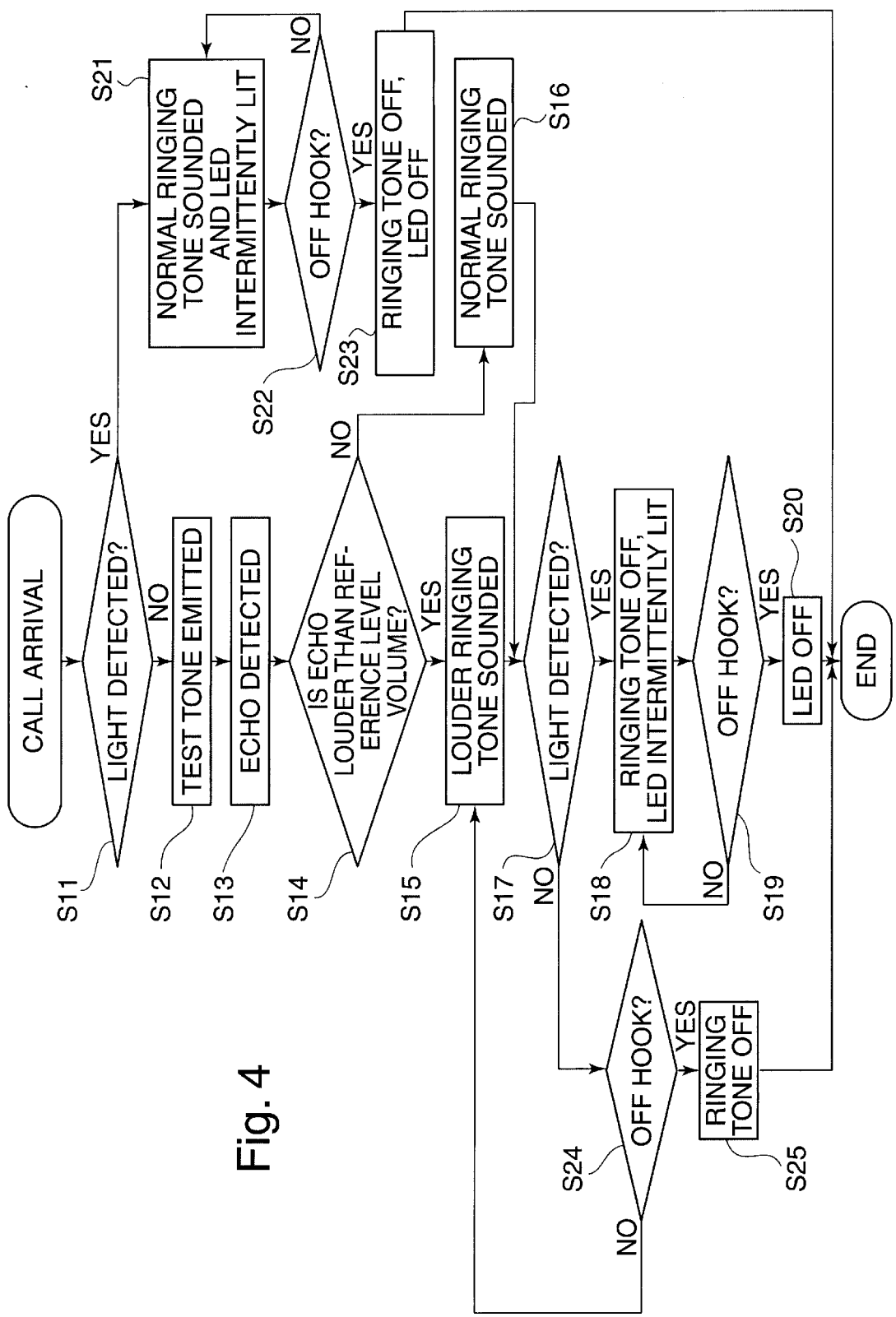

FIG. 4 is a flow chart which illustrates call processing. Referring to FIG. 4, the control circuit 3, when notified of the arrival of a call by the transmitter/receiver circuit 2 after the reference volume level is set, causes the loudspeaker 7 to sound a test tone (step S12 in FIG. 4) unless the light receiving element 4 detects light (step S11 in FIG. 4).

The control circuit 3, when the echo of the test tone emitted from the loudspeaker 7 is picked up by the microphone 5 (step S13 in FIG. 4), compares the volume of the echo with the reference volume level stored in the memory 6 (step S14 in FIG. 4).

If, as a result, the volume of the echo is found greater than the reference volume, the control circuit 3, assuming that the portable telephone is in a bag or the like, will increase the volume of the ringing tone to be emitted from the loudspeaker 7 (step S15 in FIG. 5). Or, if the echo is found less loud than the reference level, the control circuit 3 assumes that the telephone is outside the bag or the like (e.g. in a pocket of the clothing), and causes the loudspeaker 7 to emit a ringing tone in a normal volume (step S16 in FIG. 4).

Meanwhile, the light receiving element 4 is seeking to detect light even when the portable telephone is kept in a bag or the like. If the light receiving element 4 detects light when the portable telephone is taken out of the bag or the like (step S17 in FIG. 4), the control circuit 3 turns off the ringing tone emitted from the loudspeaker 7, and changes the means of notice of call arrival from the sounding of the ringing tone by the loudspeaker 7 to intermittent lighting by the LED 8 (step S18 in FIG. 4).

On the other hand, if no light is detected when the telephone is taken out of the bag or the like because the ambience is dark, putting the telephone into an off-the-hook state (step S24 in FIG. 4) will turn the ringing tone off (step S25 in FIG. 4). After that, if either the portable telephone is put into an off-the-hook state (step S19 in FIG. 4), or its power supply is turned off, or a call cut off, before any conversation is begun, the control circuit will turn off the intermittent lighting of the LED 8 (step S20 in FIG. 4).

Or if the light receiving element 4 detects light when a call arrives (step S11 in FIG. 4), the control circuit 3 will cause the loudspeaker 7 to emit a ringing tone in a normal volume and, at the same time, the LED 8 to light intermittently (step S21 in FIG. 4).

If either the portable telephone is put into an off-the-hook state (step S22 in FIG. 4), or its power supply is turned off, or a call cut off, before any conversation is begun, the control circuit will stop the ringing tone emitted from the loudspeaker 7 and turn off the LED 8 (step S23 in FIG. 4).

Or if no light is detected at step S17, it may mean that the ambience is dark or the telephone has not been taken out of the bag or the like. If the ambience is dark, detection of the off-the-hook state (step S24 in FIG. 4), the ringing tone will be turned off (step S25 in FIG. 4). Or if the telephone is still in the bag or the like, it will be assumed that the tone is inaudible, and the sounding of a louder tone is repeated.

Thus, even when the portable telephone is kept in a bag or the like, the ringing tone is made sufficiently audible outside the bag or the like by having a test tone of a preset volume emitted from the loudspeaker 7 when the arrival of a call is detected by the transmitter/receiver circuit 2 and the light receiving element 4 detects no light, causing the microphone 5 to pick up the echo of that test tone around the apparatus and, when the control circuit 3 finds the volume of the echo greater than the reference volume, effecting control so as to increase the volume of the ringing tone.

Furthermore, by turning off the ringing tone from the speaker 7 and instead notifying the arrival of a call by intermittent lighting of the LED 8 when the result of detecting attempt by the light receiving element 4 has changed from non-detection to detection of the light, the ringing tone from the loudspeaker 7, which is stopped when the portable telephone is taken out of the bag or the like while its user is being called, will not annoy the persons nearby.

While the above-described preferred embodiment of the present invention, when it is to sound a louder than usual ringing tone, emits a tone of a preset volume, the tone can as well be gradually increased in volume up to said louder than usual level when the portable telephone is taken out of the bag or the like.

What is claimed is:

1. A portable electronic apparatus comprising:

a light detector for detecting ambient light around the apparatus, and outputting a signal to a controller;

an output means for sounding a preset volume test tone when a call arrives and no ambient light is detected by said light detector;

a comparator for comparing the volume of an echo of said test tone around the apparatus with a preset reference volume level and producing a comparator output; and a controller for controlling a ringing tone volume based upon the signal from said light detector and said comparator output:

said controller producing signals to cause said output means to not sound said test tone when light is detected and to cause the ringing tone volume to be increased when said comparator detects the volume of said echo greater than said reference level.

2. A portable electronic apparatus, as claimed in claim 1, further comprising a memory for retaining as said preset reference volume level the volume of a tone resulting from the echoing around the apparatus of said test tone supplied from said output means in response to an external instruction or when said detector has detected said ambient light when the apparatus' power is turned on.

3. A portable electronic apparatus, as claimed in claim 2, wherein said controller is so configured as to vary the volume of said ringing tone according to any change in light detected by said detector while the ringing tone is being emitted in response to a call arrival.

4. A portable electronic apparatus, as claimed in claim 3, wherein said controller is so configured as to turn off the sounding of said ringing tone and instead to notify said call arrival by intermittently lighting an LED when the result of a detecting attempt by said light detector has changed from non-detection to detection of said ambient light.

5. A portable electronic apparatus, as claimed in claim 1, wherein said output means comprises a loudspeaker.

* * * * *

UNITED STATES PATENT AND TRADEMARK OFFICE
CERTIFICATE OF CORRECTION

PATENT NO. : 6,044,279
DATED : March 28, 2000
INVENTOR(S) : Hokao, Tomoaki, Ohsuge, Michihiro Page 1 of 1

It is certified that error appears in the above-identified patent and that said Letters Patent is hereby corrected as shown below:

Column 2,
Line 27, delete "tight" insert -- light --

Column 3,
Line 67, delete "51" insert -- S1 --

Signed and Sealed this

Thirteenth Day of November, 2001

Attest:

NICHOLAS P. GODICI
Attesting Officer
Acting Director of the United States Patent and Trademark Office